US010917918B2

(12) United States Patent
Yerramalli et al.

(10) Patent No.: US 10,917,918 B2
(45) Date of Patent: Feb. 9, 2021

(54) EMTC-U-UCI REPORTING PROCEDURES AND ENHANCEMENTS

(71) Applicant: QUALCOMM incorporated, San Diego, CA (US)

(72) Inventors: Srinivas Yerramalli, San Diego, CA (US); Chih-Hao Liu, San Diego, CA (US); Tamer Kadous, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 11 days.

(21) Appl. No.: 16/103,434

(22) Filed: Aug. 14, 2018

(65) Prior Publication Data

US 2019/0059102 A1    Feb. 21, 2019

Related U.S. Application Data

(60) Provisional application No. 62/545,868, filed on Aug. 15, 2017.

(51) Int. Cl.
*H04W 74/08* (2009.01)
*H04L 1/18* (2006.01)
*H04L 1/00* (2006.01)
*H04W 4/70* (2018.01)
(Continued)

(52) U.S. Cl.
CPC ......... *H04W 74/085* (2013.01); *H04L 1/0026* (2013.01); *H04L 1/1812* (2013.01);
(Continued)

(58) Field of Classification Search
CPC ..... H04W 74/085; H04W 4/70; H04W 76/27; H04W 72/0406; H04W 72/0446;
(Continued)

(56) References Cited

U.S. PATENT DOCUMENTS

2015/0208415 A1    7/2015  Xu et al.
2016/0050667 A1    2/2016  Papasakellariou et al.
(Continued)

FOREIGN PATENT DOCUMENTS

EP    2685772 A1    1/2014
EP    2835928 A1    2/2015

OTHER PUBLICATIONS

International Search Report and Written Opinion—PCT/US2018/000190—ISA/EPO—dated Apr. 3, 2019.
(Continued)

*Primary Examiner* — Duc C Ho
(74) *Attorney, Agent, or Firm* — Qualcomm Incorporated; Ke Liu

(57) ABSTRACT

Certain aspects of the present disclosure relate to methods and apparatus for receiving ACK/NACK reporting in unlicensed IoT systems with long transmission durations. In one example, an eNodeB executes an LBT protocol to gain access to a channel of a shared spectrum, receives radio resource management (RRM) measurement reports from an IoT-U, estimates a number of repetitions used to schedule the IoT-U based on the RRM measurement, and configures the maximum number of HARQ processes that can be scheduled in a frame based on the RRM measurements and the estimate of the repetitions.

22 Claims, 13 Drawing Sheets

(51) Int. Cl.
*H04W 76/27* (2018.01)
*H04L 5/00* (2006.01)
*H04W 72/04* (2009.01)
*H04W 4/02* (2018.01)
*H04L 5/14* (2006.01)

(52) U.S. Cl.
CPC .......... *H04L 1/1816* (2013.01); *H04L 1/1822* (2013.01); *H04L 1/1825* (2013.01); *H04L 1/1887* (2013.01); *H04L 5/0055* (2013.01); *H04W 4/70* (2018.02); *H04W 72/0406* (2013.01); *H04W 72/0446* (2013.01); *H04W 76/27* (2018.02); *H04L 5/001* (2013.01); *H04L 5/0048* (2013.01); *H04L 5/0098* (2013.01); *H04L 5/1469* (2013.01); *H04W 4/02* (2013.01); *H04W 74/0808* (2013.01)

(58) Field of Classification Search
CPC .. H04W 4/02; H04W 74/0808; H04L 1/0026; H04L 1/1812; H04L 1/1816; H04L 1/1822; H04L 1/1825; H04L 1/1887; H04L 5/0055; H04L 5/001; H04L 5/0048; H04L 5/0098; H04L 5/1469
See application file for complete search history.

(56) References Cited

U.S. PATENT DOCUMENTS

2016/0112162 A1    4/2016  Tabet et al.
2016/0330698 A1*  11/2016  Loehr .................... H04W 4/70

OTHER PUBLICATIONS

Partial International Search Report—PCT/US2018/000190—ISA/EPO—dated Dec. 10, 2018.

* cited by examiner

EMTC-U-UCI REPORTING PROCEDURES AND ENHANCEMENTS

CLAIM OF PRIORITY

This application claims priority to and the benefit of U.S. Provisional Patent Application No. 62/545,868 filed in the United States Patent and Trademark Office on Aug. 15, 2017, the entire content of which is incorporated herein by reference as is fully set forth below in its entirety and for all applicable purposes.

INTRODUCTION

The following relates generally to enhancements in eMTC—UCI reporting in unlicensed spectrum. The term MTC generally applies to a broad class of devices in wireless communications including, but not limited to: Internet of Things (IoT) devices, Internet of Everything (IoE) devices, wearable devices and low cost devices. One or more techniques presented herein may improve coverage and reduce power consumption in eMTC unlicensed.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may be otherwise known as user equipment (UE).

SUMMARY

A method and apparatus for receiving ACK/NACK reporting in unlicensed IoT systems with long transmission durations is described. The method may include executing an LBT protocol to gain access to a channel of a shared spectrum, receiving radio resource management (RRM) measurement reports from an IoT-U, and estimating the number of repetitions used to schedule the IoT-U based on the RRM measurements, and configuring the maximum number of HARQ processes that can be scheduled in a frame based on the RRM measurements and the estimate of the repetitions.

In addition, the method and apparatus for receiving ACK/NACK reporting in unlicensed IoT systems with long durations may also include sending at least one downlink grant on a PDCCH, wherein the at least one DL grant is a multiple TTI DL grant, wherein more than one HARQ process can be jointly scheduled on said multiple TTIs for the IoT-U.

Furthermore, the method and apparatus for receiving ACK/NACK reporting in unlicensed IoT systems with long durations may also include bundling a plurality of the HARQ processes.

Furthermore, the maximum number of HARQ processes may be a function of the TDD DL-UL subframe configuration.

Furthermore, a frame structure indicating allowable DL and UL subframes may be signaled at the start of a frame.

Furthermore, the method and apparatus for receiving ACK/NACK reporting in unlicensed IoT systems with long durations may also include sending at least one downlink grant on a PDCCH, wherein the at least one DL grant is a multiple TTI DL grant, and more than one HARQ process can be jointly scheduled on the multiple TTIs for the UE.

Also, a base station to receive ACK/NACK reporting in unlicensed IoT systems with long transmission durations is described. The base station may include a memory, a radio frequency (RF) resource, and a processor coupled to the memory and the RF resource, the processor is configured to execute an LBT protocol to gain access to a channel of a shared spectrum, receive radio resource management (RRM) measurement reports from an IoT-U, estimate the number of repetitions used to schedule the IoT-U based on the RRM measurement, and configure the maximum number of HARQ processes that can be scheduled in a frame based on the RRM measurements and the estimate of the repetitions.

A non-transitory computer readable medium to receive ACK/NACK reporting in unlicensed IoT systems with long transmission durations is described. The non-transitory computer-readable medium may include instructions to cause a processor to execute an LBT protocol to gain access to a channel of a shared spectrum, receive radio resource management (RRM) measurement reports from an IoT-U, estimate the number of repetitions used to schedule the IoT-U based on the RRM measurement, and configure the maximum number of HARQ processes that can be scheduled in a frame based on the RRM measurements and the estimate of the repetitions.

A base station to receive ACK/NACK reporting in unlicensed IoT systems with long transmission durations is also described. The base station may include a means for executing an LBT protocol to gain access to a channel of a shared spectrum, means for receiving radio resource management (RRM) measurement reports from an IoT-U, means for estimating the number of repetitions used to schedule the IoT-U based on the RRM measurement, and means for configuring the maximum number of HARQ processes that can be scheduled in a frame based on the RRM measurements and the estimate of the repetitions.

A method and apparatus for sending ACK/NACK reporting in unlicensed IoT systems with long transmission durations is also described. The method may include a UE sending radio resource management (RRM) measurement reports to a base station, and the UE receiving a maximum number of the HARQ processes in at least one of downlink control information (DCI) or a MAC control element (CE), wherein the maximum number of HARQ processes is a function of TDD DL-UL subframe configuration.

A universal equipment to send ACK/NACK reporting in unlicensed IoT systems with long transmission durations is also described. The universal equipment may include a memory, a radio frequency (RF) resource, and a processor coupled to the memory and the RF resource, the processor is configured to send radio resource management (RRM) measurement reports to a base station (BS); and receive a maximum number of the HARQ processes in at least one of downlink control information (DCI) or a MAC control element (CE), wherein the maximum number of HARQ processes is a function of TDD DL-UL subframe configuration.

A universal equipment to send ACK/NACK reporting in unlicensed IoT systems with long transmission durations is also described. The universal equipment may include means for sending radio resource management (RRM) measurement reports to a base station (BS); and means for receiving a maximum number of the HARQ processes in at least one of downlink control information (DCI) or a MAC control element (CE), wherein the maximum number of HARQ processes is a function of TDD DL-UL subframe configuration.

A non-transitory computer readable medium to send ACK/NACK reporting in unlicensed IoT systems with long transmission durations is described. The non-transitory computer-readable medium may include instructions to cause a processor to send ACK/NACK reporting in unlicensed IoT systems with long transmission durations, comprising sending radio resource management (RRM) measurement reports to a base station (BS); and receiving a maximum number of the HARQ processes in at least one of downlink control information (DCI) or a MAC control element (CE), wherein the maximum number of HARQ processes is a function of TDD DL-UL subframe configuration.

DETAILED DESCRIPTION

Aspects of the disclosure are initially described in the context of a wireless communication system. Aspects of the disclosure are then illustrated by and described with reference to apparatus diagrams, system diagrams, and flowcharts that relate to receiving on transmit and transmitting on receive.

Figure 1:
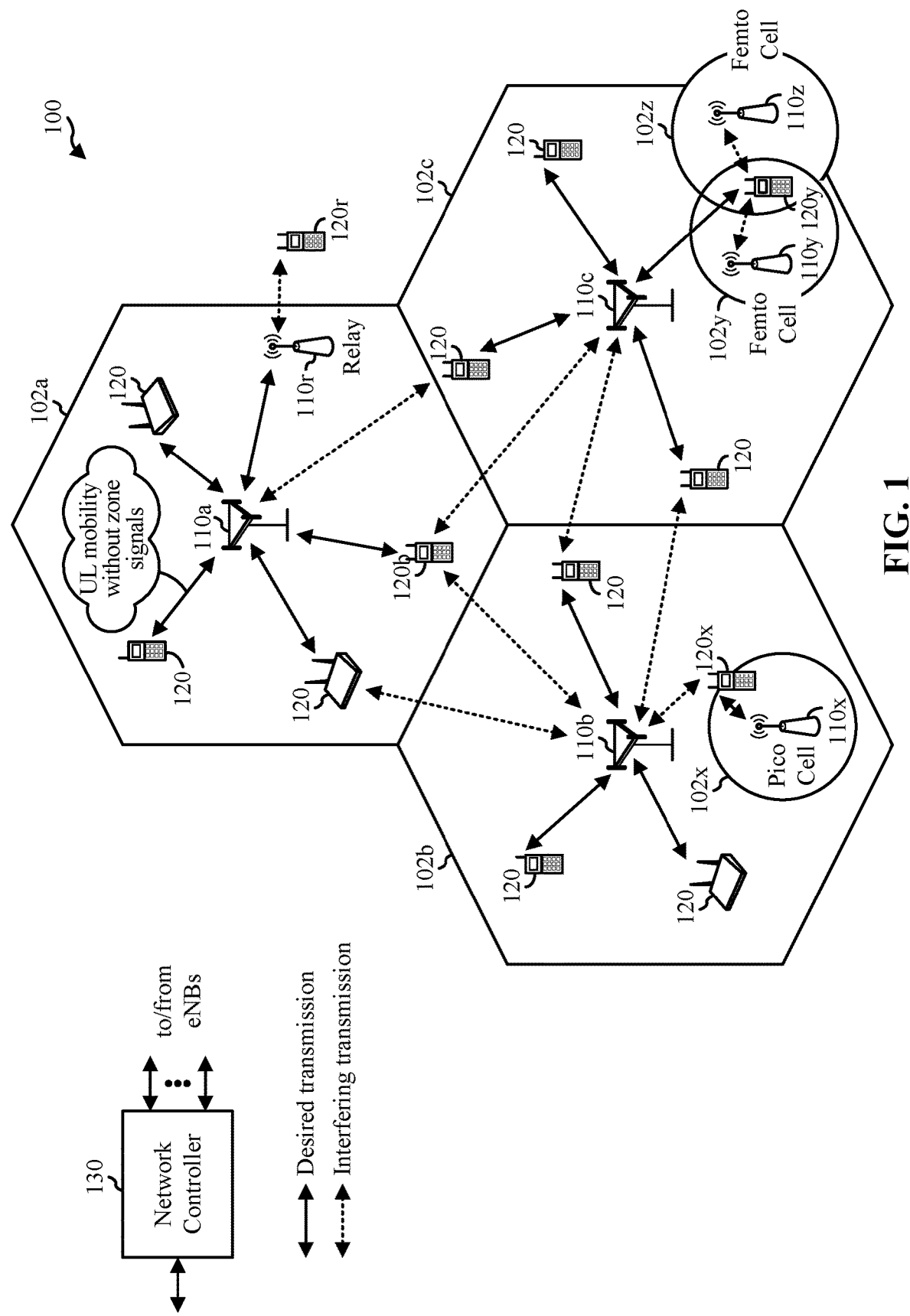
FIG. 1 is a block diagram conceptually illustrating an example telecommunications system, in accordance with certain aspects of the present disclosure.

FIG. 1 illustrates an example wireless network 100, such as a new radio (NR) or 5G network, in which aspects of the present disclosure may be performed.

As illustrated in FIG. 1, the wireless network 100 may include a number of BSs 110 and other network entities. A BS 110 may be a station that communicates with UEs 120. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, gNB, or TRP may be interchangeable. In some examples, a cell may not necessarily be stationary, and the geographic area of the cell may move according to the location of a mobile station 120. In some examples, the base stations 110 may be interconnected to one another and/or to one or more other base stations 110 or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS 110 may provide communication coverage for a macro cell, a pico cell, a femto cell, and/or other types of cell. A macro cell may cover a relatively large geographic area (e.g., several kilometers in radius) and may allow unrestricted access by UEs 120 with service subscription. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs in a Closed Subscriber Group (CSG), UEs for users in the home, etc.). A BS 110 for a macro cell may be referred to as a macro BS 110. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE 120 may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a healthcare device, a biometric sensor/device, a wearable device such as a smart watch, smart clothing, smart glasses, virtual reality goggles, a smart wrist band, smart jewelry (e.g., a smart ring, a smart bracelet, etc.), an entertainment device (e.g., a music device, a video device, a satellite radio, etc.), a vehicular component or sensor, a smart meter/sensor, a robot, a drone, industrial manufacturing equipment, a positioning device (e.g., GPS, Beidou, terrestrial), or any other suitable device that is configured to communicate via a wireless or wired medium. Some UEs may be considered machine-type communication (MTC) devices or enhanced MTC (eMTC) devices, which may include remote devices that may communicate with a base station, another remote device, or some other entity. They may also be referred to as MTC unlicensed (MTC-U), or enhanced MTC unlicensed (eMTC-U) devices if they communicate over unlicensed spectrum. Machine type communications (MTC) may refer to communication involving at least one remote device on at least one end of the communication and may include forms of data communication which involve one or more entities that do not necessarily need human interaction. For example, MTC and/or machine-to-machine (M2M) communication may refer to data communication technologies that allow devices to communicate with one another or a base station without human intervention. MTC UEs may include UEs that are capable of MTC communications with MTC servers and/or other MTC devices through Public Land Mobile Networks (PLMN), for example. MTC and eMTC UEs include, for example, robots, drones, remote devices, sensors, meters, monitors, cameras, location tags, etc., that may communicate with a BS, another device (e.g., remote device), or some other entity. An MTC UE may provide, for example, connectivity for or to a network (e.g., a wide area network such as Internet or a cellular network) via a wired or wireless communication link. As part of Release 13, 3GPP has specified a new radio interface, the Narrowband Internet of Things (NB-IoT), which is optimized for machine type traffic. It is kept simple to minimize battery consumption and reduce device costs. MTC UEs, as well as other UEs, may be implemented as Internet of Things devices (IoT), narrowband IoT (NB-IoT) devices, Internet of Things devices that operate in the unlicensed spectrum (IoT-U), and narrowband IoT devices that operate in the unlicensed spectrum (NB-IoT-U). MTC may refer to communications from devices that integrate sensors or meters to measure or capture information and relay that information to a central server or application program that can make use of the information or present the information to humans interacting with the program or application. In many cases, MTC devices are power constrained. MTC devices may be used to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. eMTC-U supports both idle mode and extended idle mode DRX.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (e.g., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (e.g., DL or UL) for data transmission and the link direction for each subframe may be dynamically switched.

Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP), or gNB) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
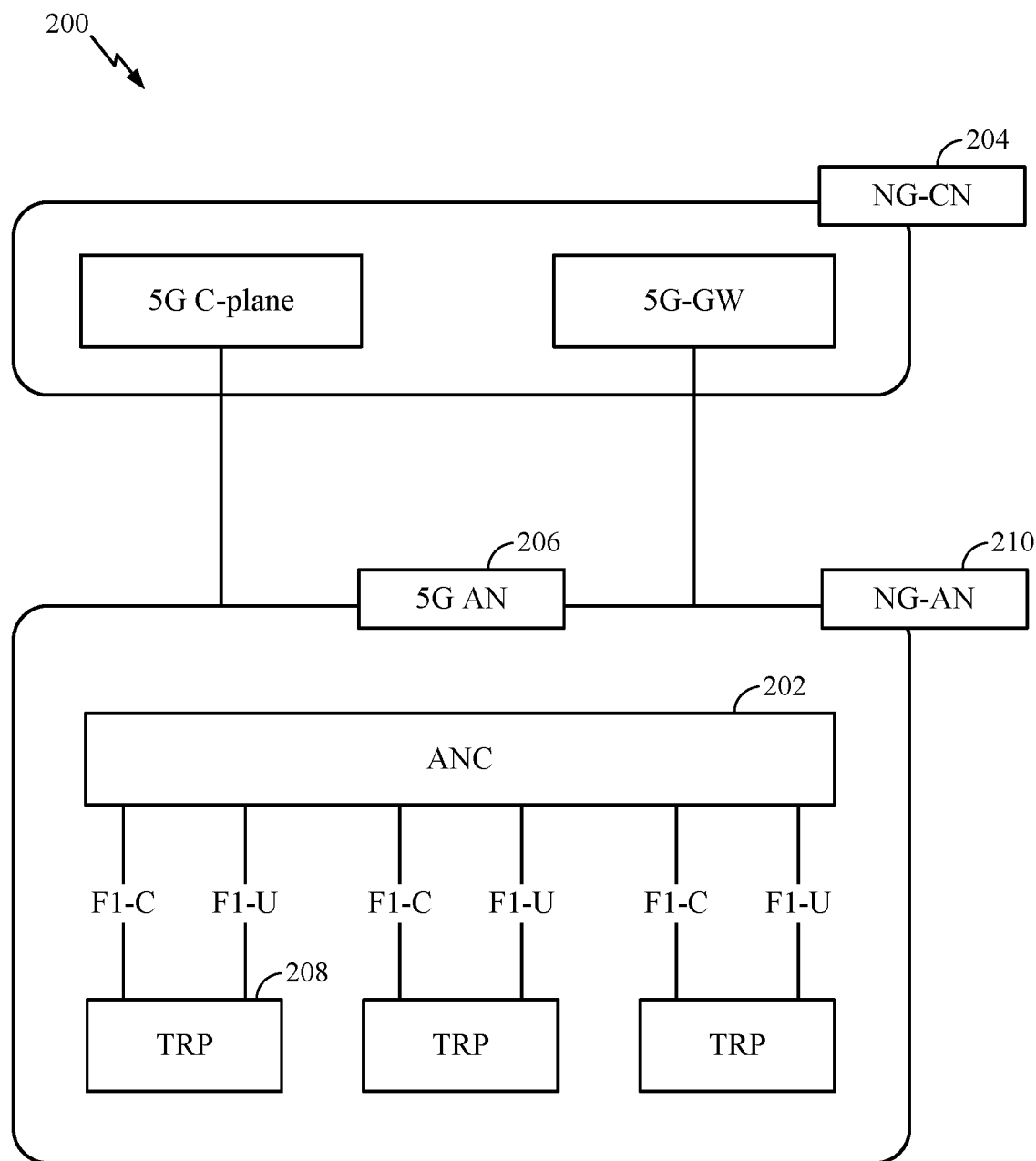
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, gNB, or some other term). As described above, a TRP may be used interchangeably with "cell." In wireless communications system 100, UE 120 may use a DRX cycle to enable the efficient use of battery power. After a radio resource control (RRC) connection has been established between a gNB (which may also be referred to as BSs, NR BSs, Node Bs, 5G NBs, APs, or some other term) 110 and a UE 120, the UE 120 may enter a sleep state when not actively communicating. The DRX cycle may determine how frequently UE 120 wakes up to check for incoming transmissions, such as paging messages, scheduling information, and data.

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
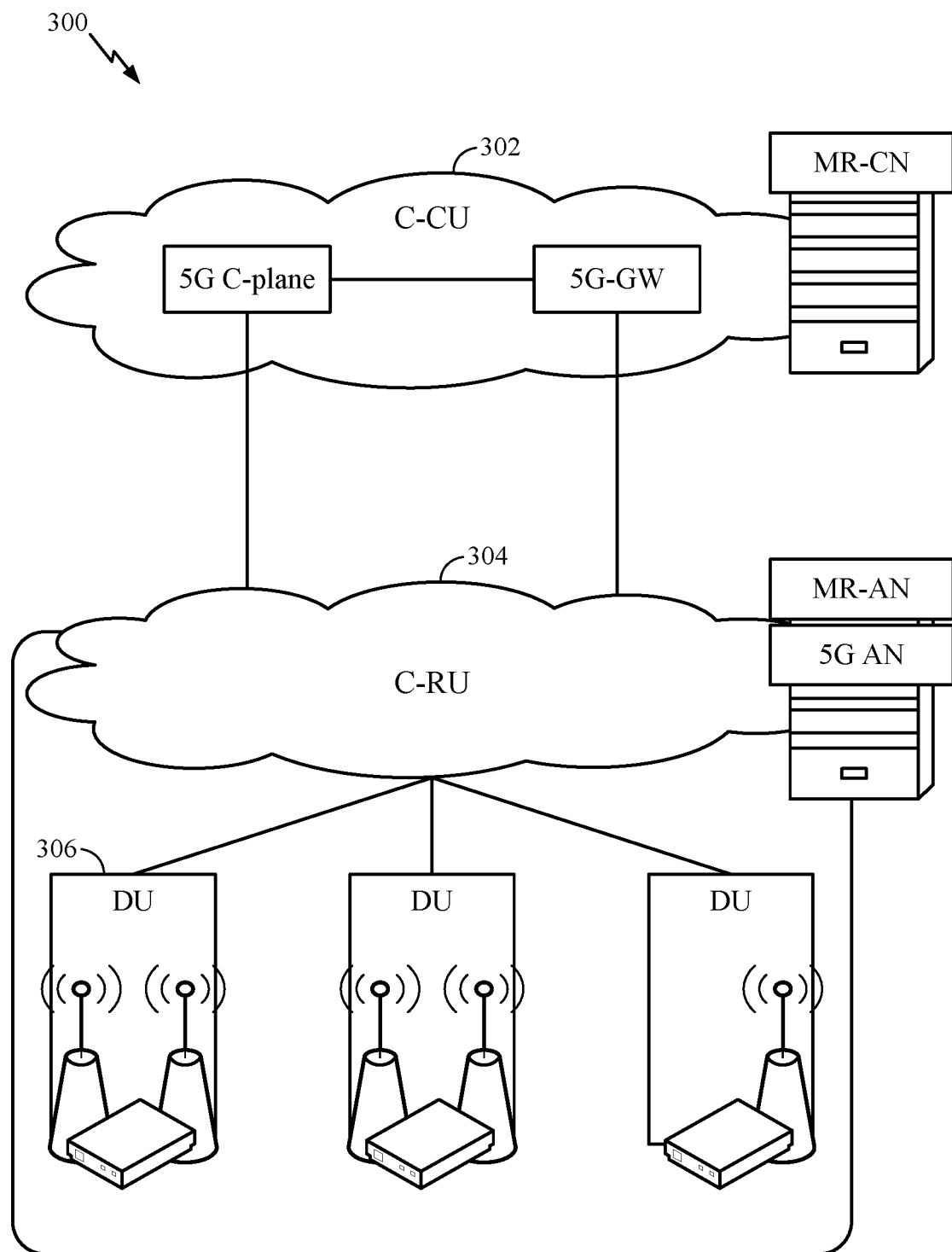
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
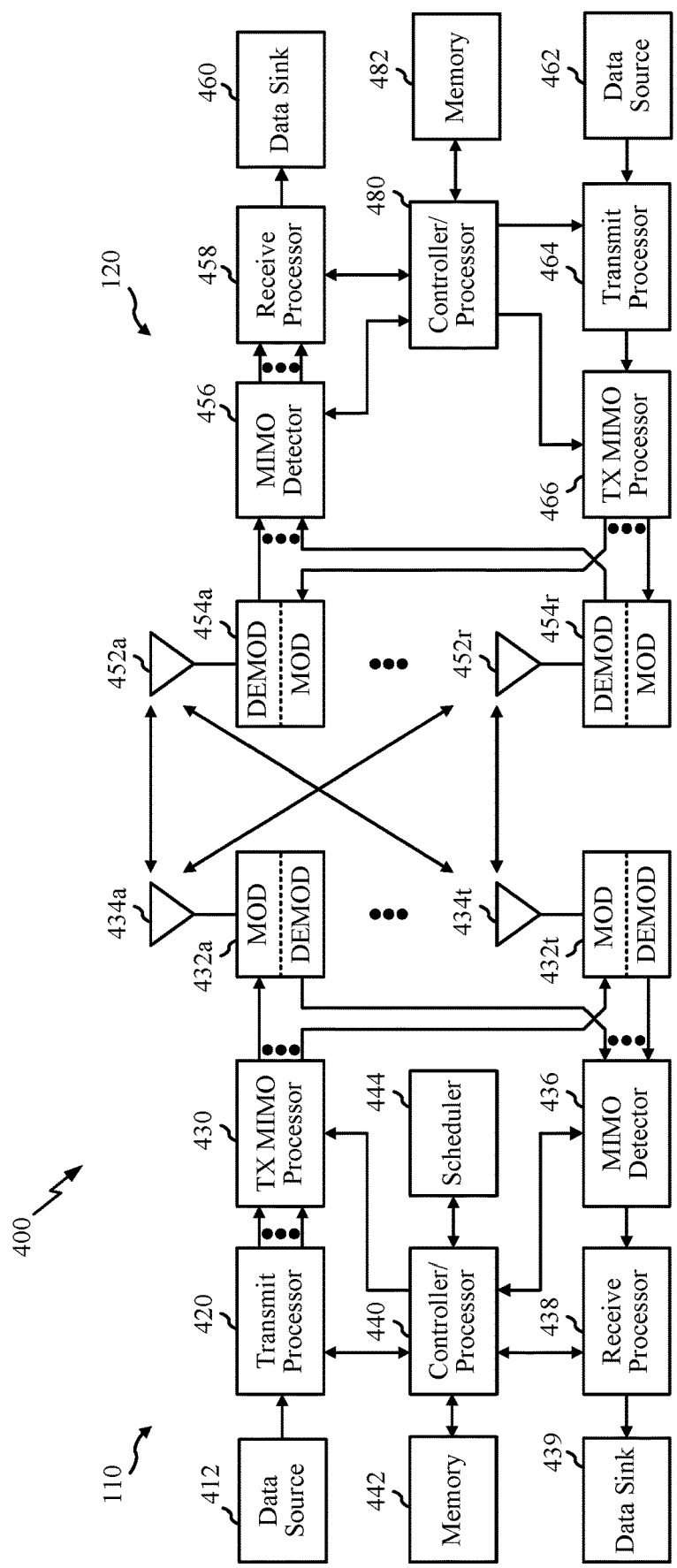
FIG. 4 is a block diagram conceptually illustrating a design of an example base station (BS) and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 6-12.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480. According to one or more cases, CoMP aspects can include providing the antennas, as well as some Tx/Rx functionalities, such that they reside in distributed units. For example, some Tx/Rx processings can be done in the central unit, while other processing can be done at the distributed units. For example, in accordance with one or more aspects as shown in the diagram, the BS mod/demod 432 may be in the distributed units.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct the processes for the techniques described herein. The processor 480 and/or other processors and modules at the UE 120 may also perform or direct processes for the techniques described herein. The memories 442 and 482 may store data and program codes for the BS 110 and the UE 120, respectively. A scheduler 444 may schedule UEs for data transmission on the downlink and/or uplink.

Figure 5A:
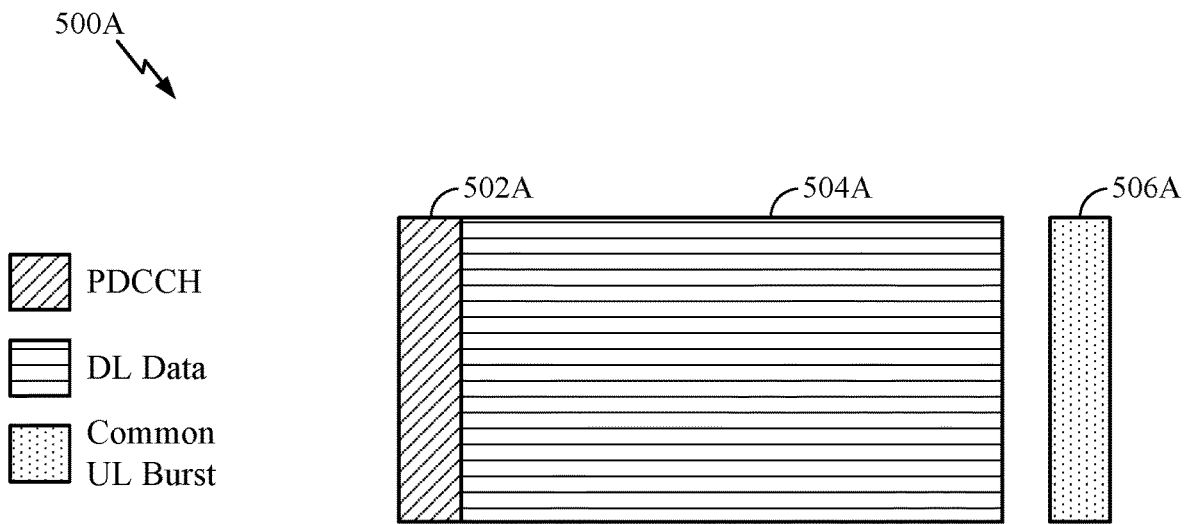
FIG. 5A is a diagram illustrating an example of a downlink (DL)-centric subframe according to some aspects of the present disclosure.

FIG. 5A is a diagram 500A showing an example of a DL-centric subframe. The DL-centric subframe may include a control portion 502A. The control portion 502A may exist in the initial or beginning portion of the DL-centric subframe. The control portion 502A may include various scheduling information and/or control information corresponding to various portions of the DL-centric subframe. In some configurations, the control portion 502A may be a physical DL control channel (PDCCH), as indicated in FIG. 5A. The DL-centric subframe may also include a DL data portion 504A. The DL data portion 504A may sometimes be referred to as the payload of the DL-centric subframe. The DL data portion 504A may include the communication resources utilized to communicate DL data from the scheduling entity 202 (e.g., eNB, UE, BS, Node B, 5G NB, TRP, etc.) to the subordinate entity 204 (e.g., UE). In some configurations, the DL data portion 504A may be a physical DL shared channel (PDSCH). The DL-centric subframe may also include a common UL portion 506A. The common UL portion 506A may sometimes be referred to as an UL burst, a common UL burst, and/or various other suitable terms. The common UL portion 506A may include feedback information corresponding to various other portions of the DL-centric subframe. For example, the common UL portion 506 may include feedback information corresponding to the control portion 502A. Non-limiting examples of feedback information may include an ACK signal, a NACK signal, a HARQ indicator, and/or various other suitable types of information. The common UL portion 506A may include additional or alternative information, such as information pertaining to random access channel (RACH) procedures, scheduling requests (SRs), sounding reference signals (SRS) and various other suitable types of information. As illustrated in FIG. 5A, the end of the DL data portion 504A may be separated in time from the beginning of the common UL portion 506A. This time separation may sometimes be referred to as a gap, a guard period, a guard interval, and/or various other suitable terms. This separation provides time for the switchover from DL communication (e.g., reception operation by the subordinate entity 204 (e.g., UE)) to UL communication (e.g., transmission by the subordinate entity 204 (e.g., UE)). One of ordinary skill in the art will understand, however, that the foregoing is merely one example of a DL-centric subframe and alternative structures having similar features may exist without necessarily deviating from the aspects described herein.

Figure 5B:
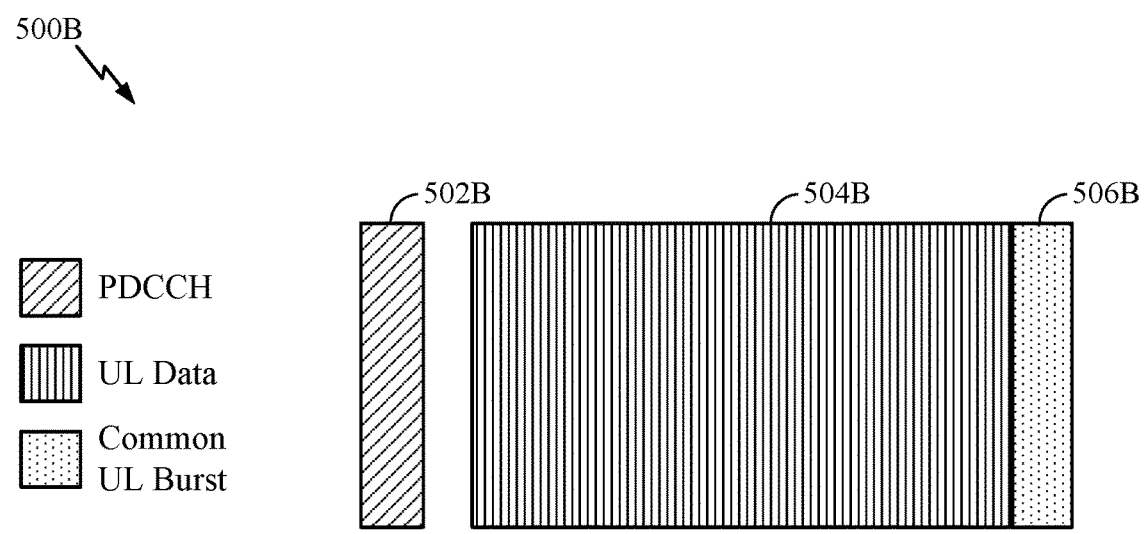
FIG. 5B is a diagram illustrating an example of an uplink (UL)-centric subframe according to some aspects of the present disclosure.

FIG. 5B is a diagram 500B showing an example of an UL-centric subframe. The UL-centric subframe may include a control portion 502B. The control portion 502B may exist in the initial or beginning portion of the UL-centric subframe. The control portion 502B in FIG. 5B may be similar to the control portion 502A described above with reference to FIG. 5A. The UL-centric subframe may also include an UL data portion 504B. The UL data portion 504B may sometimes be referred to as the payload of the UL-centric subframe. The UL portion may refer to the communication resources utilized to communicate UL data from the subordinate entity 204 (e.g., UE) to the scheduling entity 202 (e.g., eNB). In some configurations, the control portion 502B may be a physical UL shared channel (PUSCH). As illustrated in FIG. 5B, the end of the control portion 502B may be separated in time from the beginning of the UL data portion 504B. This time separation may sometimes be referred to as a gap, guard period, guard interval, and/or various other suitable terms. This separation provides time for the switchover from DL communication (e.g., reception operation by the scheduling entity 202 (e.g., UE)) to UL communication (e.g., transmission by the scheduling entity 202 (e.g., UE)). The UL-centric subframe may also include a common UL portion 506B. The common UL portion 506B in FIG. 5B may be similar to the common UL portion 506A described above with reference to FIG. 5A. The common UL portion 506B may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein. In summary, a UL centric subframe may be used for transmitting UL data from one or more mobile stations to a base station, and a DL centric subframe may be used for transmitting DL data from the base station to the one or more mobile stations. In one example, a frame may include both UL centric subframes and DL centric subframes. In this example, the ratio of UL centric subframes to DL subframes in a frame may be dynamically adjusted based on the amount of UL data and the amount of DL data that need to be transmitted. For example, if there is more UL data, then the ratio of UL centric subframes to DL subframes may be increased. Conversely, if there is more DL data, then the ratio of UL centric subframes to DL subframes may be decreased.

eMTC-U UCI Reporting Processes and Enhancements

UEs such as MTC-U, eMTC-U, IoT-U, or NB-IoT-U, etc. may be designed to operate in the unlicensed spectrum. However, many of these devices may, for example, use coverage extensions because it is desirable to not transmit in a single TTI and instead desirable to use a lot of repetition of transmitted data to improve coverage, such, as for example, of radio conditions are poor. Each transmission in LTE corresponds to one TTI (Transmission Time Interval) which is the smallest scheduling time interval in LTE. Therefore, data should be processed within 1 msec. or 1 subframe. Multiple repetitions of data (or longer transmission times) is one technique used to enhance coverage. Other techniques include frequency hopping. By good coverage, it is meant that the UEs such as MTC-U, eMTC-U, IoT-U, or NB-IoT-U within a geographic area successfully communicate with a BS within that cell. Repetition is used so that the UEs within a cell, both far away and close to an BS to successfully communicate with that that BS. By using multiple repetitions of data the effective data rate may decrease, but the coverage is increased to the point that UEs within a cell communicate successfully with the BS. In some embodiments, a transmitting apparatus such as an eNB or base station 110, or a UE 120 described with reference to FIGS. 1 and 4, may use a gating interval to gain access to a channel of the shared spectrum (e.g., to a physical channel of the licensed or unlicensed spectrum). The gating interval may define the application of a contention-based protocol, such as a Listen Before Talk (LBT) protocol. The present method and apparatus contains a fixed frame structure with a self-contained transmission framework with the following characteristics: i) Before every DL/UL transmissions, the downlink (DL) transmission is subject to a Listen Before Talk (LBT) protocol, but uplink (UL) transmissions carrying ACK/NACKs are not be subject to the LBT protocol. Thus, the LBT protocol is engaged before the frame is accessed by the BS; and ii) The ACK/NACK for all the DL transmissions sent by the ENB to the UE in a frame are transmitted before the frame ends. That is, the transmissions are self-contained and the ACK/NACKs for all the DL transmissions received from a BS are transmitted in UL subframes in the same frame and not a later frame.

When using a gating interval that defines the application of an LBT protocol, the gating interval may indicate when a transmitting apparatus performs a Clear Channel Assessment (CCA). The outcome of the CCA may indicate to the transmitting apparatus whether a channel of the shared unlicensed spectrum is available or in use. When the CCA indicates that the channel is available (e.g., "clear" for use), the gating interval may allow the transmitting apparatus to use the channel, typically for a predefined transmission interval. Thus, with unlicensed spectrum, the BS performs a "listen before talk" procedure before transmitting a message. If interference is detected, the BS will not transmit.

Figure 6:
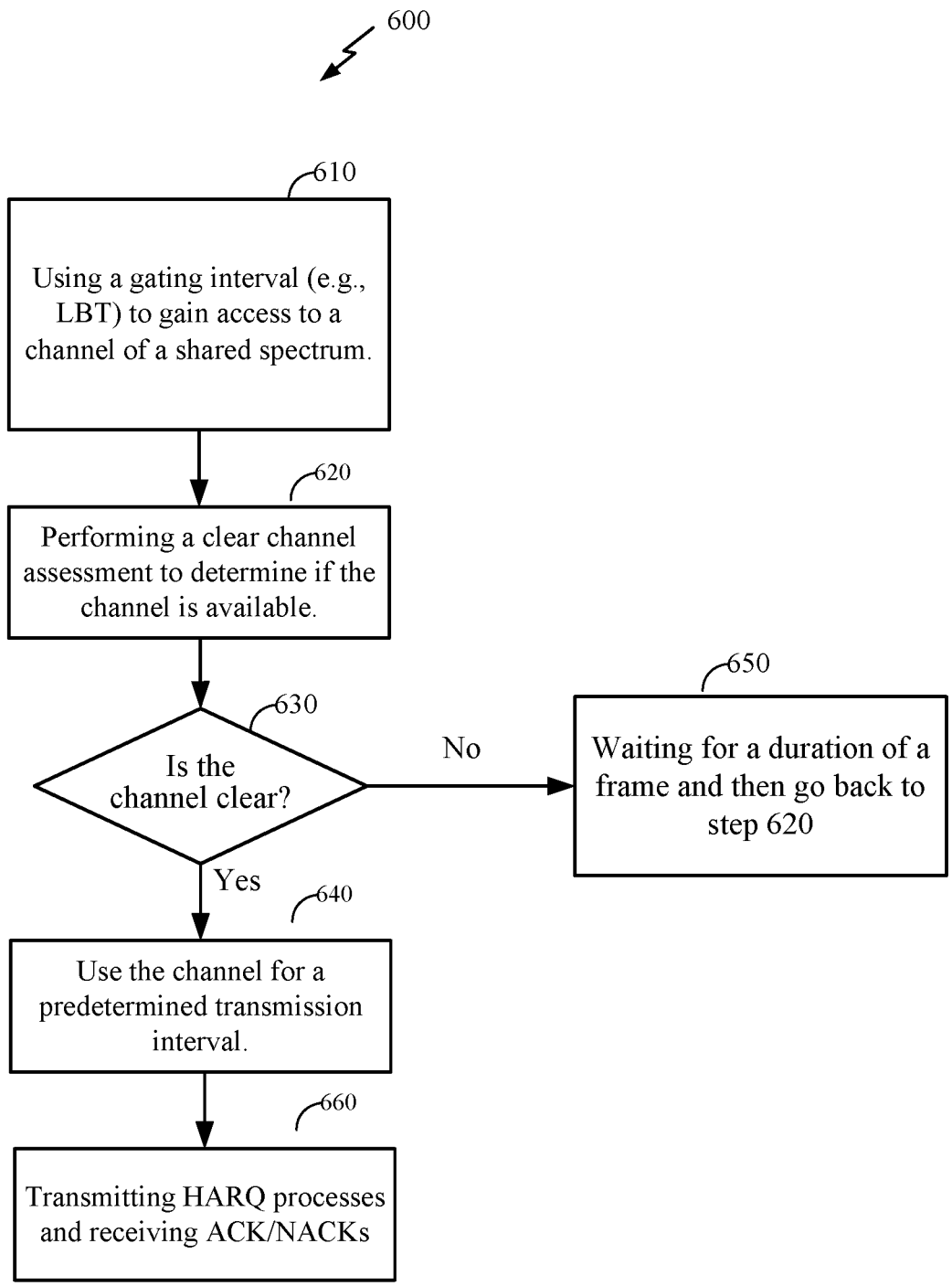
FIG. 6 is a flowchart 600 of the steps taken by an BS 110 to use a channel in a shared spectrum.

FIG. 6 is a flowchart 600 of the steps taken by an BS 110 to use a channel of a shared spectrum. Step 610, use a gating interval (e.g., LBT) to gain access to a channel of a shared spectrum. Step 620, perform a clear channel assessment to determine if the channel is available. If the channel is clear (step 630), use the channel for a predefined transmission interval (step 640). If the channel is not clear, the BS waits for a duration (in one example a frame), and tries to access the unlicensed spectrum again (step 650). If the BS succeeds in winning the LBT in the DL, then it transmits several HARQ processes for UEs with good coverage on the DL and receives an ACK from all of them within the UL part of the frame (Step 660).

Figure 7:
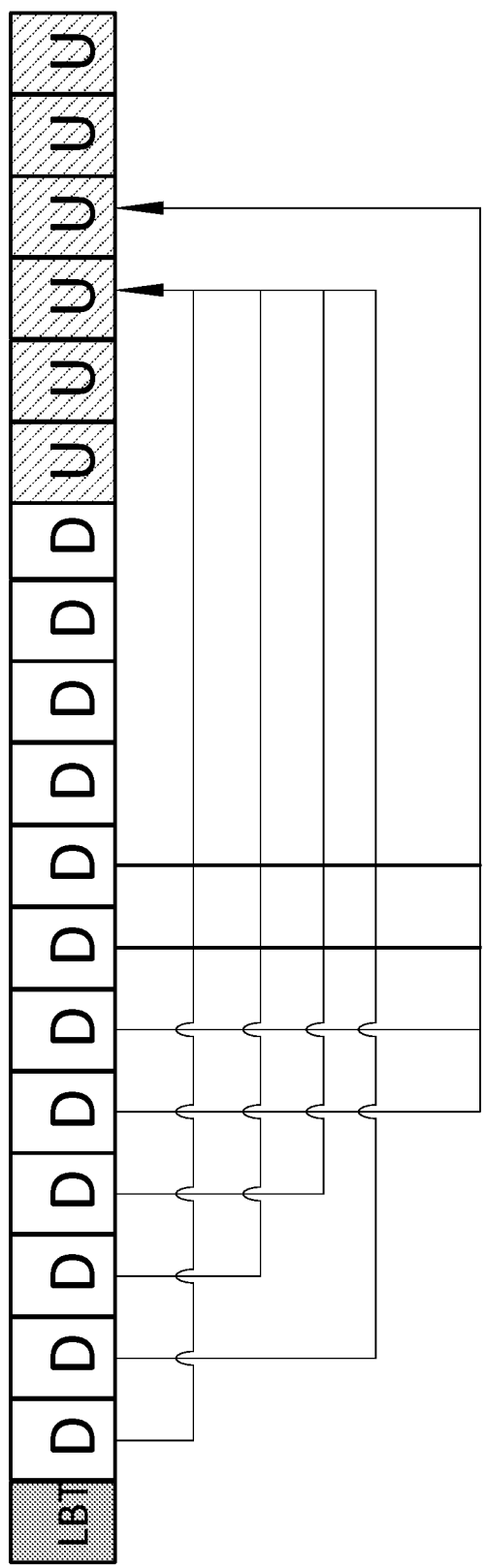
FIG. 7 discloses a frame structure comprising an LBT protocol, twelve DL subframes, a DL_UL transition, and six UL subframes.

Within each frame, which is 10 msec. long in LTE, a UL subframe can be found to transmit an ACK/NACK for an HARQ process received on a DL subframe. So there may be frequent switching between DL and UL subframes. As discussed above, an a LBT must be performed by the BS before the BS can transmit on the DL. Eventually the LBT may fail which would break up the entire transmission. To address this, the BS, after a successful LBT, transmits a long string of DL subframe transmissions which may be followed by UL subframes which carry ACK/NACKs which reduced the switching between DL and UL subframes. And that is an example of the fixed frame structure. See FIG. 7 which discloses a frame structure comprising an LBT protocol, twelve DL subframes, a DL_UL transition, and six UL subframes. In FIG. 7, the UE has good coverage so that repetition of the DL subframes is not used in this example. Thus, many DL subframes are transmitted once. FIG. 7 shows the UE being scheduled with eight HARQ processes after an LBT. So the UE received data in 8 DL subframes and sends back 8 ACK bits to the eNB, 4 bundled on UL subframe 3 and the other 4 bundled on UL subframe 4. The HARQ feedback in response to downlink data transmission consists of a single ACK/NAK bit per HARQ process. Because there is a long run of DL transmissions in FIG. 7, the BS will transmit on all the DL subframes before receiving any ACK/NACKs on the UL. Thus, there won't be frequent switching to new DL subframes, which in turn results in less LBT performances.

Two things that affect HARQ feedback are: i) quality of coverage and ii) the TDD configuration (the DL-UL ratio) in each frame. The quality of coverage affects the number of ACK/NACK bits fed back. For example, in good coverage a lot of PDSCH could be scheduled which may result in a lot of ACK-NACK bits being transmitted. On the other hand, in poor coverage a lot more repetitions may be used. Hence, a smaller number of PDSCH may be scheduled and consequently the number of ACK/NACK bits that need to be carried by the UL will be smaller.

TDD DL-UL Subframe Configuration

Figure 8:
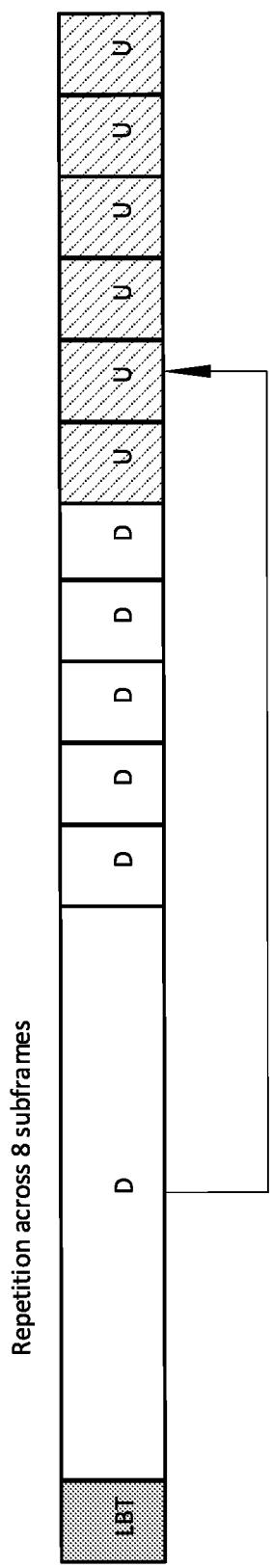
FIG. 8 discloses a frame structure comprising an LBT protocol, thirteen DL subframes, a DL_UL transition, and six UL subframes.

Different scheduling grants can be transmitted at different aggregation/repetition levels even for a single UE and a UE may miss receiving some grants. That is, depending on scheduling flexibility, multiple grants may be scheduled to the same UE in a frame using different repetition levels. FIG. 8 discloses a frame structure comprising an LBT protocol, thirteen DL subframes, a DL_UL transition, and six UL subframes. In FIG. 8, the data from the BS is repeated eight times on eight DL subframes because of the poor coverage on the DL. When the UE is in good coverage, the UL PUCCH can carry a large payload (e.g., a large number of bits), but when the UE is in poor coverage only a small number of bits may be carried on the PUCCH (along with PUCCH repetition). It can carry a large payload because if there is good coverage on the DL, there is good coverage on the UL as well. But if there is poor coverage on the DL, there is poor coverage on the UL as well. For UEs with poor coverage, then the number of ACK bits is smaller (one bit in the example shown in FIG. 8) So the number of bits used on the UL to report ACK/NACK is a function of coverage.

The present method and apparatus addresses how ACK/NACK reporting should be configured for a UE used in unlicensed spectrum.

Figure 9:
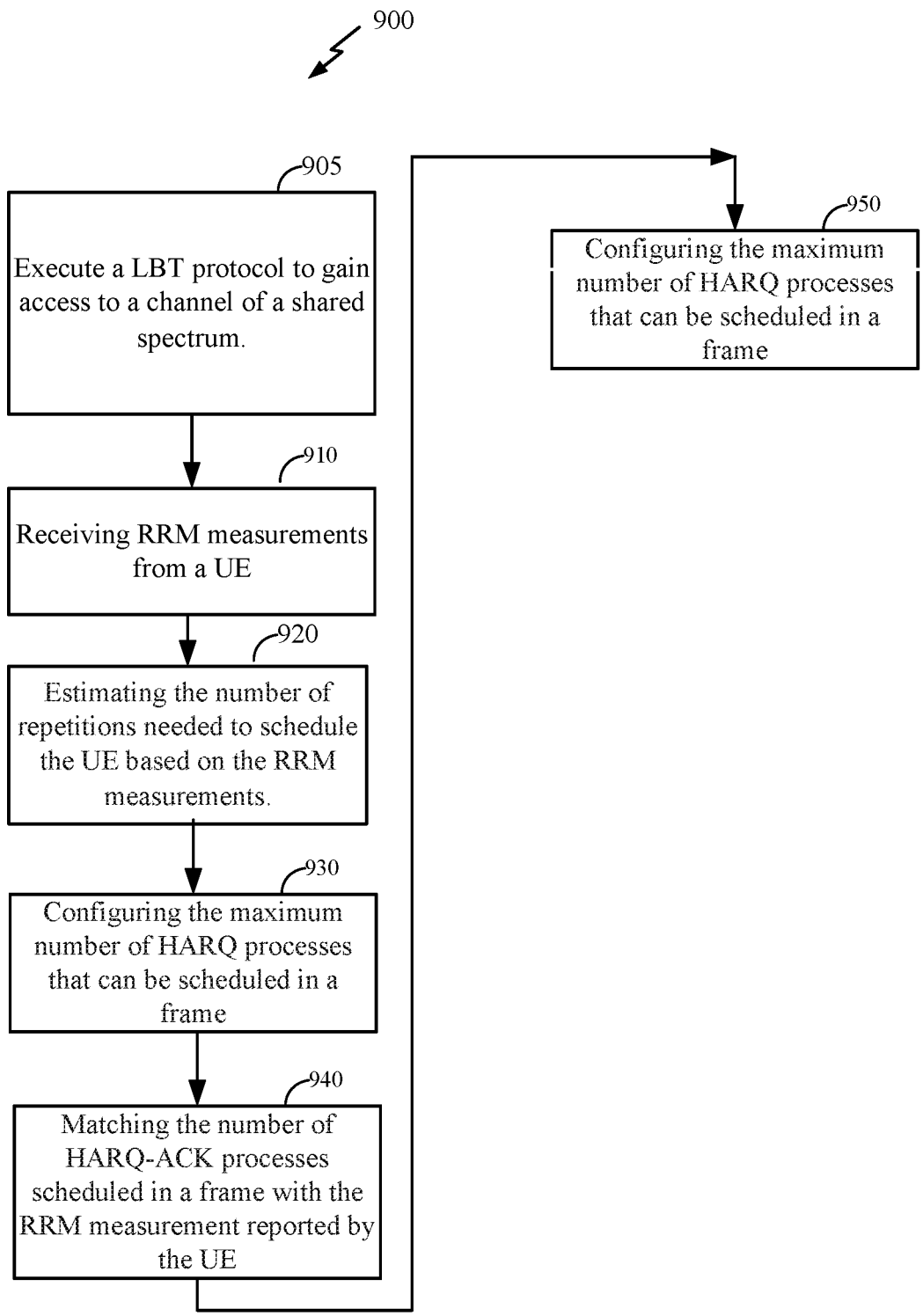
FIG. 9 is a flowchart 900 of the steps taken to manage ACK/NACK reporting in unlicensed IoT systems with long transmission durations.

The following is a description of multiplexing procedures used for managing ACK/NACK reporting in unlicensed IoT systems with long transmission durations. It allows for efficient scheduling of data to reduce ACK/NACK payload. The ACK payload on the PUCCH (or PUSCH) is a function of (equal to) the maximum number of HARQ processes and is fixed. The UE is typically configured with radio resource management (RRM) measurement reporting (e.g. Reference Signal Received Power (RSRP)/Reference Signal Received Quality (RSRQ) reporting). The reason is because in an LTE system, a UE monitors and detects the presence of multiple cells and performs cell reselection to ensure that it is "camped" on the most suitable cell. A UE "camped" on a particular cell will, in addition to monitoring the System Information and Paging of that cell, continue to monitor the strength and quality of other cells to determine if cell reselection is required. FIG. 9 is a flowchart 900 of the steps taken to manage ACK/NACK reporting in unlicensed IoT systems with long transmission durations. First, the BS 110 will execute an LBT protocol to gain access to a channel of a shared spectrum (step 905). Next, the BS 110 receives RRM measurements from the UE 120 (step 910) and estimates the number of repetitions needed to schedule the UE 120 based on the RRM measurements (step 920). Based on the RRM measurements and the estimate, the BS can configure the maximum number of HARQ processes that can be scheduled in a frame (step 930). Typically, if the RSRP and RSRQ measurement results are low, more repetition is used. The maximum number of HARQ processes is budgeted to account for the longest DL transmission in a frame. The BS 110 will (or compare) the number of HARQ-ACK processes scheduled in a frame with the RRM measurement reported by the UE 120 (step 940). If for example, the RSRP is poor, e.g., 3 dB below the noise floor, the BS may schedule a large number of UL subframes for reporting ACK/NACK signals. The BS may schedule anywhere from one up to the maximum number of HARQ processes. In FIG. 7, there is good coverage and the BS 110 scheduled 8 DL subframes on which on which a HARQ process would occur. There doesn't have to be a one-to-one correspondence between the number of HARQ processes scheduled on the DL by the BS 110 and the payload which are the bits representing ACK/NACK signals.

In another example, a radio resource control (RRC) message can be used to configure the maximum number of HARQ processes that can be scheduled in each frame (step 950).

In another example, the maximum number of HARQ-ACK processes can also be indicated in Downlink Control Information (DCI) or in a MAC control element (MAC-CE) as well as a RRC configuration message. DCI is used to signal allocation of resources to the UE. For example, DCI may be used to schedule downlink resources on the PDSCH or uplink resources on the PUSCH. The control information sent on each PDCCH may convey one or more downlink grants, one or more uplink grants, power control information, and/or other information. In another example, the number of ACKs to be bundled together could also be specified as part of this configuration. So, for example, the BS may send 8 HARQ processes on the DL. If the ACK/NACK bits for HARQ processes 1&2, 3&4, 5&6 and 7&8 are bundled together, then the BS will only receive 4 bits and not 8 bits in the payload. The bundling can be configured by an RRC message. Since all the scheduled HARQ processes are ACKed in the same frame (i.e., self-contained), there is no ambiguity at the eNB as to which ACK bit corresponds to which HARQ. The reason is that since the pending HARQ-ACK processes are always ACKed at the end of the frame, there is no carry over to the next frame.

In still another example, If the transmission is not self-contained and the ACK is transmitted in a later frame, then the BS can configure the reporting by indicating one of two points.

(1) Reporting frame periodicity (e.g. once every 2 frames or 4 frames). So HARQ processing may be reported on every other frame or every forth frame. But there still will be a maximum number of HARQ processes per frame. So if the reporting periodicity is once every two 2 frames with 8 HARQ-ACK processes per frame, then 16 HARQ-ACK processes will be reported on each reporting frame; or (2) Reporting delay for each frame, i.e. all HARQ processes in the current frame are ACKed in the next frame (or following frames. So all ACK/NACKs received are for HARQ-ACK processes in the previous frame or previous frames.

As stated above, the maximum number of HARQ processes (and thus max ACK payload on PUCCH) that can be scheduled in a frame is a function of the TDD configuration (DL-UL configuration). In certain systems (e.g., LTE Rel-12), subframes can be classified as fixed subframes and dynamic subframes. See Table 4.2-2 of 3GPP TS 36.211 below which show seven UL/DL configurations numbered 0-6:

| Table 4.2-2 of 3GPP TS 36.211 - Uplink Downlink Configurations | | | | | | | | | | | |
|---|---|---|---|---|---|---|---|---|---|---|---|
| Uplink-downlink configuration | Downlink-to-Uplink Switch-point periodicity | Subframe number | | | | | | | | | |
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In some versions of LTE specifications, it is possible to dynamically adapt TDD DL-UL subframe configurations based on the actual traffic needs, also referred to as evolved Interference Management for Traffic Adaptation (eIMTA). If, during a short duration, a large data burst on downlink is used, the configuration can be changed from, for example, configuration #1 (6 DL, 4 UL) to configuration #5 (9 DL, 1 UL). As seen, the ratio of DL frames to UL frames can change. Thus, the number of DL-UL transitions along with the number of UL and DL subframes may be dynamic. However, because of the dynamic TDD configuration (different DL-UL ratios in each frame), the maximum number of HARQ processes that can be scheduled (and are actually scheduled) can vary in each frame.

Figure 10:
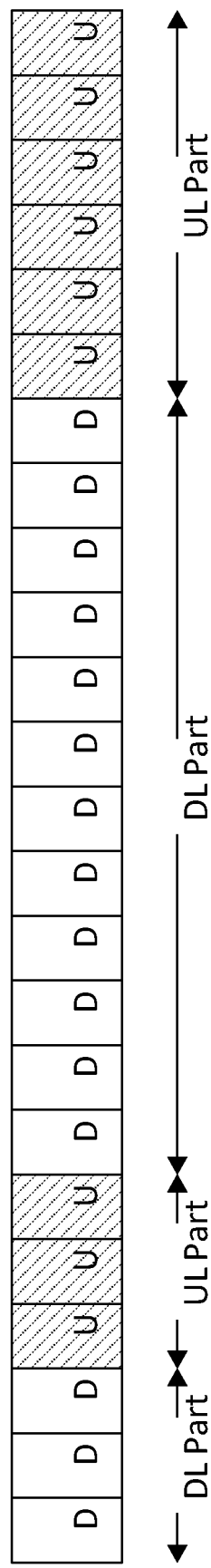
FIG. 10 discloses a frame structure number comprising multiple UL and DL subframes and multiple DL-UL transitions.

FIG. 10 discloses a frame structure number comprising multiple UL and DL subframes and multiple DL-UL transitions and the frame structure information may be signaled to the UE at the start of each frame using RRC signaling. Unlike LTE, the frame structure for eMTC changes over the frame and the frame length can vary. Typically, an eMTC frame can be 20 msec to 80 msec. long, Also, the first 10 msec of the frame may not look like the next 10 msec because the frame structure may be dynamic. For example, the first 10 msec may have 6 UL subframes and 4 DL subframes, while the next 10 msec may have 2UL subframes and 8 DL subframes. In addition, within each eMTC frame, there can be a single DL-UL transition or multiple DL-UL transitions. The frame in FIG. 10 is 24 subframes long. In FIG. 10, the first 10 msec has 3 DL subframes followed by 3 UL subframes followed by 4 DL subframes. The next 10 msec has 8 DL subframes followed by 2 UL subframes. The last 40 msec of the frame comprises 4 UL subframes.

The frame structure information may be signaled to the UE at the start of each frame by the BS. However, there may be times where the UE misses the TDD-FDD configuration signaling. In these scenarios, the BS may optionally configure a fallback PUCCH resource in which the UE can report ACK/NACKS in the scenario where the UE misses the DL-UL configuration signaling. The BS is essentially saying if the IoT-U UE misses or can't figure out the frame structure, it can assume this default configured frame structure. This default can be configured by the RRC. In one example, this fallback resource is always on a guaranteed UL subframe. Alternatively, the BS can request an ACK/NACK transmission using a DCI based trigger if it fails to detect any ACK/NACK transmission on the UL.

The DAI is a field in the downlink resource grant signaled to a UE which indicates how many subframes in a time window have contained transmissions to that UE. The downlink assignment index (DAI) is used to specify the number of remaining bits to be ACKed using a mod 4. (The modulo operation produces the remainder of dividing one number by another number. For example, "7 mod 2" would be equal to 1 because 7 divided by 2 leaves a quotient of 3 and a remainder of 1). It keeps a 2-bit counter running to keep track of HARQ processes that are scheduled. However, this requires 2 bits per grant to be sent. This is applicable when LTE is operated in the Time Domain Duplex (TDD) mode. In addition, the DAI enables the UE to determine whether it has received all the downlink transport blocks for which it should transmit a combined ACK/NACK. See 3GPP TS36.213 Section 7.3. In situations where two bits per grant may be too high due to tight limits to the link budget on the downlink, it may be preferable to use a fixed payload size on the UL rather than a dynamic payload size indicated by the DAI value in each DCI.

PUCCH Resource Selection

Having figured out what the ACK/NACK payload to be transferred is, the next step is to figure out which PUCCH resource to use to carry the payload (i.e., the ACK/NACK feedback) to the BS. A PUCCH consists of one Resource Block (RB) at one end of the system bandwidth followed by another RB at the opposite end of the channel spectrum (in the following slot). The PUCCH carries the Uplink Control Information (UCI). In some examples, the UCI carries the CQI, the SR and the HARQ ACK/NACK. In LTE, typically the PUCCH resource to be used is identified by the start CCE. In addition, the PUCCH resource may be indicated in the DCI by using an ACK-NACK resource offset or TPC bit override along with using higher layer configured parameters.

One problem with eMTC is that even with coverage extension, there could be multiple DL and UL grants transmitted in one frame (and thus the need for multiple ACK/NACK resources in that one frame.) In LTE eMTC, channels may be assigned priorities. For example, if there is a collision between UCI and PUSCH, then PUSCH is dropped in the collided subframes. The PUSCH is dropped in the colliding part of the frame.

DL resources (for DL, UL grants) are subject to LBT and the DL is link budget limited compared to the UL. Hence DL transmissions are valuable due to their limited availability. So it is advantageous that the above discussed collisions be avoided.

One way to avoid collisions between channels like the one between UCI and PUSCH discussed above, is to independently transmit the UCI and the PUSCH. For example, separate PUCCH resources may be configured in each frame where the UEs can transmit HARQ-ACK on dedicated resources. The PUCCH resource selection can be based on a DCI indication as in LTE. In one example, one bit in the DCI indicates whether the PUSCH corresponding to this grant carries ACK/NACK feedback.

Another way to avoid collisions between channels is to puncture the PUSCH in one (or more) configured subframes to allow the DCI to be transmitted on those punctured subframes. With puncturing, you notch out some resources to be used by a DCI. If more robustness is needed, multiple PUSCH's (corresponding to multiple bits) can carry the same UCI payload. The location can be implicit (such as last repetition of the current frame or the last repetition of first UL subframe group, etc.)

A third way to avoid collisions between channels is to allow for piggybacking (rate matching) UCI on (one of the) PUSCH. Because there may be some ambiguity between the eNB and the IoT-U about which of the UL grants will carry the ACK/NACK data, one bit in the DCI may be used to indicate whether a PUSCH can be used for UCI piggybacking instead of automatically selecting the PUSCH resource. If more robustness is needed, multiple PUSCH's can carry the same UCI payload. A subset of PUSCH REs in some subframes (as configured by the BS) may be repurposed to allow the UCI to be transmitted (similar to LTE). All PUSCH subframe repetitions need not be used for UCI piggybacking. In one example, all subframes/repetitions up to a configured limit may be used. For example, just use two subframes in the frame may be used for piggybacking.

Figure 11:
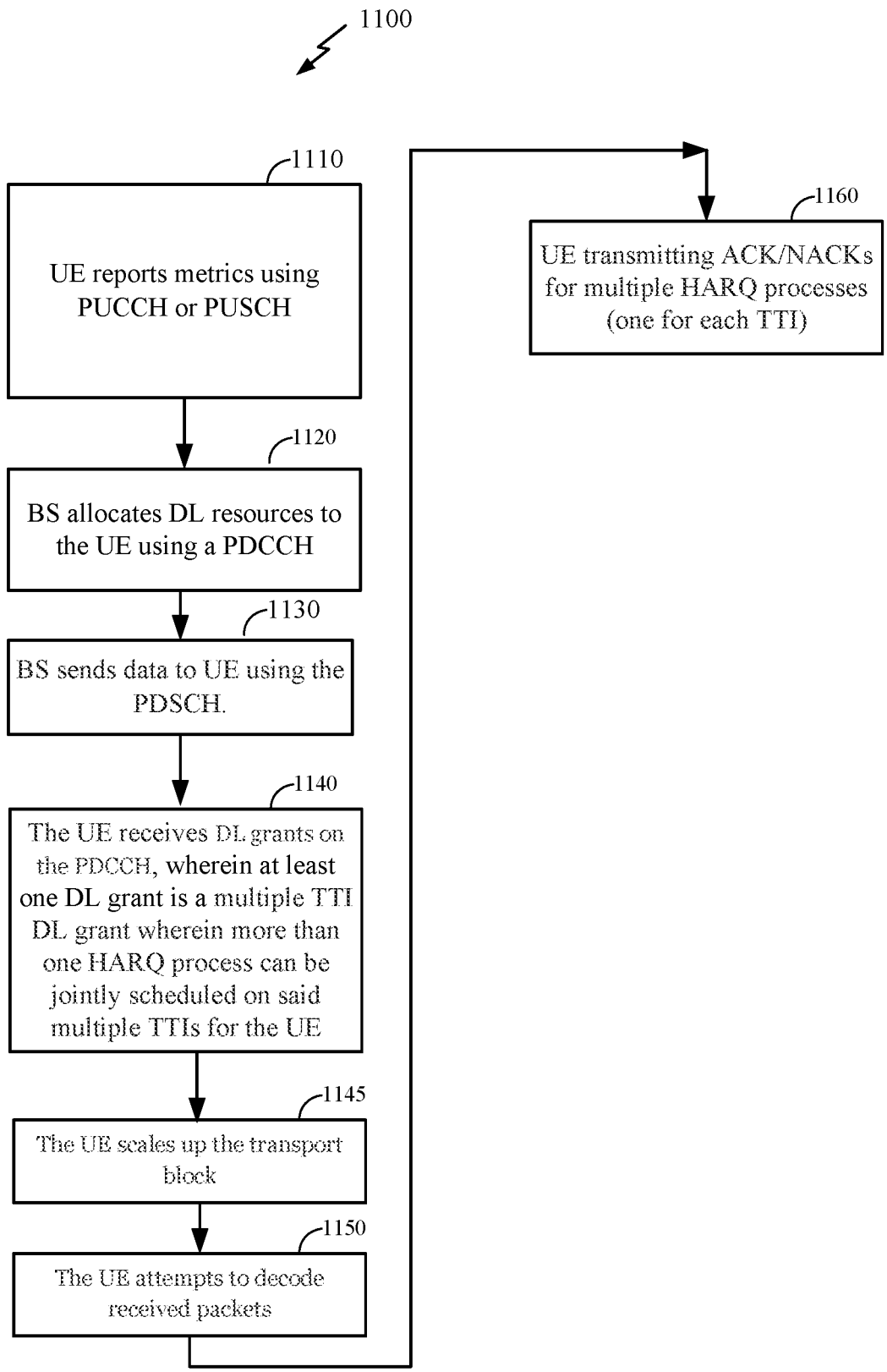
FIG. 11 is a flowchart 1100 showing the steps taken using multi-TTI DL grants in which more than one HARQ process can be jointly scheduled for the UE, where each TTI can handle one HARQ process.

FIG. 11 is a flowchart 1100 showing the steps taken using multi-TTI DL grants in which more than one HARQ process can be jointly scheduled for the UE, where each TTI can handle one HARQ process. As shown in flowchart 1100 in FIG. 11, in LTE the UE reports metrics such as the CQI, PMI, and RI using the PUCCH (or the PUSCH) (Step 1110). The BS uses a scheduler to dynamically allocate DL resources to the UE using the PDCCH (step 1120). The control information sent on each PDCCH may convey one or more downlink grants, one or more uplink grants, power control information, and/or other information. Also, user data is sent by the BS using the PDSCH (step 1130) The UE receives the DL grants on the PDCCH (Step 1140), wherein at least one DL grant is a multiple TTI DL grant wherein more than one HARQ process can be jointly scheduled on the multiple TTIs for the UE.

In this good coverage scenario, the UE scales up the transport block size (TBS) by N times to enable a large payload representing multiple HARQ processes to be sent and thus reduce PDCCH scheduling overhead. For one DL grant on the PDCCH having a scaled up transport block size, more than one HARQ process can be jointly scheduled on said DL grant for the UE. So the one grant on the PDCCH may span multiple subframes. Since the PDCCH spans multiple TTIs, the transport block may be scaled up accordingly (step 1145).

The UE attempts to decode the received packet (step 1150) and sends ACK/NACK or multiple HARQ processes (one for each TTI) (step 1160) When the UE is in very good coverage, one subframe is sufficient to schedule the PUSCH payload. For example, SINR>10 dB can be considered good coverage. It is expected that in such a scenario, a UE would be scheduled with multiple PDSCHs in each frame. However, scheduling multiple PDSCHs to carry multiple ACKs is a DL PDCCH resource intensive operation.

To improve resource utilization for PDCCH (which allows multiplexing more UEs), one approach uses multi-TTI DL grants in which more than one HARQ process can be jointly scheduled for the UE, where each TTI can handle one HARQ process.

In one example, N consecutive HARQ processes can be scheduled, where N is the number of TTIs in the multi-TTI DL grant. One HARQ process per TTI. So for a grant used for HARQ process #3 that is scheduled for 4 TTIs, ACK/NACKs will be sent for multiple HARQ processes (one for each TTI). In this example HARQ processes 3-6. For the grant used for HARQ process #3 that is scheduled for 4 TTIs, the transport block is scaled up by a factor of four also. The redundancy version (RV) and/or new data indicators (NDI)s for the additional HARQ processes can be additionally indicated in the DCI. In one example, the redundancy version (RV) is not essential and can be removed to reduce DCI payload size. In that example, for each HARQ process an NDI is indicated or toggled. So by scheduling one grant, multiple HARQ processes were also scheduled. (A redundancy version (RV) of a packet contains different combinations of systematic and FEC bits. LTE uses four RVs that are repeatedly sequenced through until the packet is received correctly or until a maximum number of retransmissions have been sent, at which time HARQ declares a failure).

When a UE is in good coverage, the UE may search for both single TTI and multi-TTI DL grants (and UL grants). In one example using the present method and apparatus, only multi-TTI grants may be specified in the UL.

Alternatively, in good coverage a single PDSCH can be transmitted on resources from multiple subframes. As discussed above, the UE reports the CQI. PMI, and RI using the PUCCH (or the PUSCH). The DCI may indicate that multiple subframes may be used for PDSCH transmission In poor coverage scenario, the same DCI can be used to schedule extra repetitions instead of extra HARQ processes. The UE also receives the data sent by the BS on the PDSCH. The UE attempts to decode the received packet and sends an ACK/NACK using the PUSCH or PUCCH.

For this method and apparatus, the UE has the ability to process large transport blocks (TBs). So, this method and apparatus may be configured to UEs which support large TB sizes (which can be a UE capability and indicated to the BS). So the one grant on the PDCCH may span multiple subframes.

Figure 12:
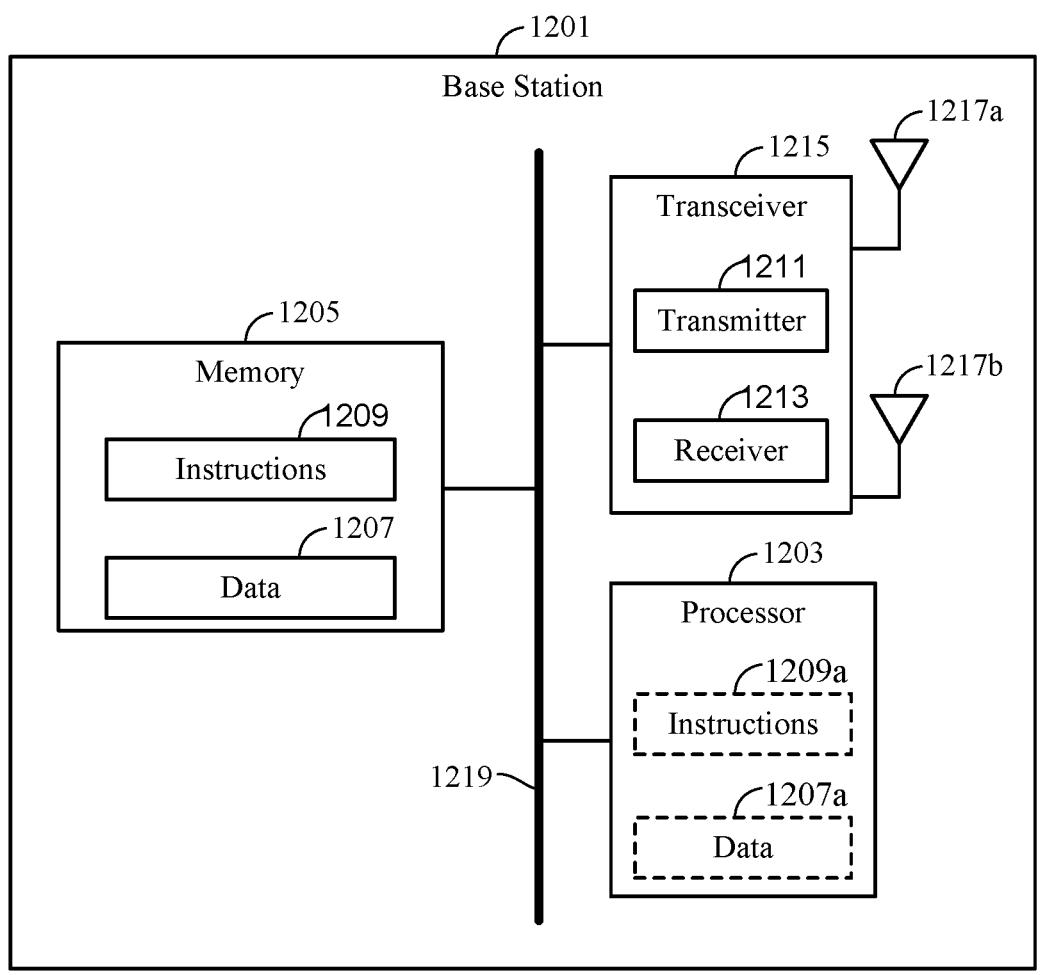
FIG. 12 illustrates certain components that may be included within a base station.

FIG. 12 illustrates certain components that may be included within a base station 1201. The base station 1201 may be an access point, a NodeB, an evolved NodeB, etc. The base station 1201 includes a processor 1203. The processor 1203 may be a general purpose single- or multi-chip microprocessor (e.g., an ARM), a special purpose microprocessor (e.g., a digital signal processor (DSP)), a microcontroller, a programmable gate array, etc. The processor 1203 may be referred to as a central processing unit (CPU). Although just a single processor 1203 is shown in the base station 1201 of FIG. 12, in an alternative configuration, a combination of processors (e.g., an ARM and DSP) could be used.

The base station 1201 also includes memory 1205. The memory 1205 may be any electronic component capable of storing electronic information. The memory 1205 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 1107 and instructions 1109 may be stored in the memory 1205. The instructions 1109 may be executable by the processor 1203 to implement the methods disclosed herein. Executing the instructions 1409 may involve the use of the data 1207 that is stored in the memory 1205. When the processor 1203 executes the instructions 1209, various portions of the instructions 1209a may be loaded onto the processor 1203, and various pieces of data 1407a may be loaded onto the processor 1203.

The base station 1101 may also include a transmitter 1211 and a receiver 1213 to allow transmission and reception of signals to and from the wireless device 1201. The transmitter 1211 and receiver 1213 may be collectively referred to as a transceiver 1215. Multiple antennas 1217a-b may be electrically coupled to the transceiver 1215. The base station 1401 may also include (not shown) multiple transmitters, multiple receivers and/or multiple transceivers.

The various components of the base station 1201 may be coupled together by one or more buses, which may include a power bus, a control signal bus, a status signal bus, a data bus, etc. For the sake of clarity, the various buses are illustrated in FIG. 12 as a bus system 1219.

Figure 13:
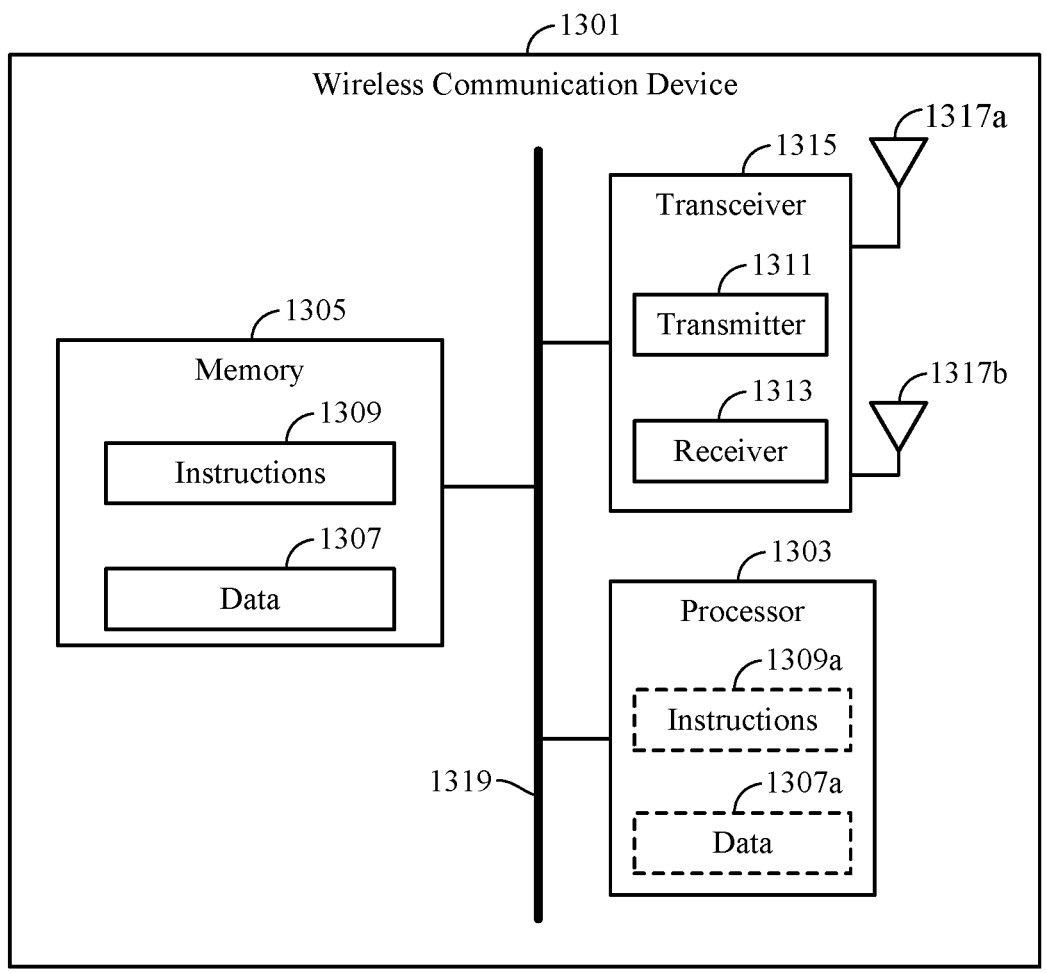
FIG. 13 illustrates certain components that may be included within a wireless communication device.

FIG. 13 illustrates certain components that may be included within a wireless communication device 1301. The wireless communication device 1301 may be an access terminal, a mobile station, a user equipment (UE), etc. The wireless communication device 1501 includes a processor 1303. The processor 1303 may be a general purpose single- or multi-chip microprocessor (e.g., an ARM), a special purpose microprocessor (e.g., a digital signal processor (DSP)), a microcontroller, a programmable gate array, etc. The processor 1303 may be referred to as a central processing unit (CPU). Although just a single processor 1303 is shown in the wireless communication device 1201 of FIG. 11, in an alternative configuration, a combination of processors (e.g., an ARM and DSP) could be used.

The wireless communication device 1301 also includes memory 1305. The memory 1305 may be any electronic component capable of storing electronic information. The memory 1305 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 1307 and instructions 1309 may be stored in the memory 1305. The instructions 1309 may be executable by the processor 1303 to implement the methods disclosed herein. Executing the instructions 1309 may involve the use of the data 1307 that is stored in the memory 1305. When the processor 1303 executes the instructions 1309, various portions of the instructions 1309a may be loaded onto the processor 1303, and various pieces of data 1507a may be loaded onto the processor 1203.

The wireless communication device 1301 may also include a transmitter 1311 and a receiver 1313 to allow transmission and reception of signals to and from the wireless communication device 1301. The transmitter 1311 and receiver 1313 may be collectively referred to as a transceiver 1315. Multiple antennas 1317a-b may be electrically coupled to the transceiver 1315. The wireless communication device 1301 may also include (not shown) multiple transmitters, multiple receivers and/or multiple transceivers.

The various components of the wireless communication device 1201 may be coupled together by one or more buses, which may include a power bus, a control signal bus, a status signal bus, a data bus, etc. For the sake of clarity, the various buses are illustrated in FIG. 13 as a bus system 1319. It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for receiving on transmit and transmitting on receive.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for receiving on transmit and transmitting on receive.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical (PHY) locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 IX, IX, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11 (wireless fidelity (Wi-Fi)), IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 of FIG. 1 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Thus, aspects of the disclosure may provide for receiving on transmit and transmitting on receive. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed:

1. A method of receiving ACK/NACK reporting from a user equipment (UE) in unlicensed IoT systems with long transmission durations, comprising:
   a base station (BS) executing an LBT protocol to gain access to a channel of a shared spectrum; and
   the BS configuring a maximum number of HARQ processes that can be scheduled in a frame on the channel based on radio resource management (RRM) measurements and an estimate of repetitions.

2. The method according to claim 1, further comprising:
   the BS matching a number of the HARQ processes to schedule in a frame with the RRM measurement reported by the UE.

3. The method of receiving ACK/NACK reporting according to claim 1, further comprising bundling a plurality of the HARQ processes.

4. The method according to claim 1, wherein the maximum number of the HARQ processes that can be scheduled in the frame is indicated by a radio resource control (RRC) message.

5. The method of receiving ACK/NACK reporting according to claim 1, further comprising indicating the maximum number of the HARQ processes in at least one of downlink control information (DCI) or a MAC control element (CE).

6. The method according to claim 1, wherein the frame is self-contained, wherein all the scheduled HARQ processes are ACKed in the same frame.

7. The method of receiving ACK/NACK reporting according to claim 1, wherein the HARQ processes are reported every n frames, wherein n>1.

8. The method of receiving ACK/NACK reporting according to claim 1, wherein the HARQ processes are reported with a delay, wherein ACK/NACKs received are for the HARQ processes in a previous frame.

9. The method of receiving ACK/NACK reporting according to claim 1, wherein the ACK/NACK transmissions are reported on a fallback resource.

10. The method of receiving ACK/NACK reporting according to claim 1, further comprising: a BS requesting at least one of the ACK/NACK transmissions from said UE using a DCI based trigger.

11. The method of receiving ACK/NACK reporting according to claim 1, wherein the maximum number of HARQ processes is a function of TDD DL-UL subframe configuration.

12. The method of receiving ACK/NACK reporting according to claim 1, further comprising:
   the BS receiving radio resource management (RRM) measurement reports from the user equipment (UE) and
   the BS estimating of the number of repetitions used to schedule the UE based on the RRM measurement.

13. The method of receiving ACK/NACK reporting according to claim 1, further comprising: the BS independently receiving uplink control information (UCI) and at least one physical uplink shared channel (PUSCH), wherein collisions are avoided between said UCI and said at least one PUSCH.

14. The method of receiving ACK/NACK reporting according to claim 1, comprising:
   the BS receiving metrics reported by the UE;
   the BS allocating DL resources to the UE using a PDCCH;
   the BS sending at least one downlink grant on the PDCCH, wherein the at least one DL grant is a multiple-Transmission-Time-Interval (multiple-TTI) DL grant for multiple TTIs, and more than one said HARQ process can be jointly scheduled on said multiple TTIs for the UE;
   the BS sending data to the UE using a PDSCH; and
   the BS receiving ACK/NACKs for multiple said HARQ processes, one for each TTI of the multiple TTIs.

15. The method according to claim 14, further comprising:
   scaling up a transport block size for the multiple-TTI DL grant.

16. A base station to receive ACK/NACK reporting from a user equipment (UE) in unlicensed IoT systems with long transmission durations, comprising:
   a memory;
   a radio frequency (RF) resource; and
   a processor coupled to the memory and the RF resource, configured to:
      execute an LBT protocol to gain access to a channel of a shared spectrum; and configure a maximum number of HARQ processes that can be scheduled in a frame on the channel based on radio resource management (RRM) measurements and an estimate of repetitions.

17. The base station according to claim 16, wherein the processor is further configured to:
   match a number of the HARQ processes to schedule in the frame with the RRM measurement reported by the UE.

18. The base station according to claim 16, wherein the processor is further configured to:
   bundle a plurality of said HARQ processes.

19. The base station according to claim 16, wherein the maximum number of HARQ processes that can be scheduled in said frame is indicated by a radio resource control (RRC) message.

20. The base station according to claim 16, wherein the processor is further configured to:
   indicate the maximum number of HARQ processes in at least one of downlink control information (DCI) or a MAC control element (CE).

21. The base station according to claim 16, wherein the scheduled HARQ processes are ACKed in the same frame.

22. The base station according to claim 16, wherein the HARQ processes are reported every n frames, wherein n>1.

* * * * *